US009015497B2

(12) United States Patent
Peeters et al.

(10) Patent No.: US 9,015,497 B2
(45) Date of Patent: Apr. 21, 2015

(54) DATA PROCESSING APPARATUS

(75) Inventors: Michael Michel Patrick Peeters, Tourinnes-la-Grosse (BE); Ventzislav Nikov, Haasrode (BE); Claude Debast, Lembeek (BE)

(73) Assignee: Telit Automotive Solutions NV, Leuven (BE)

( * ) Notice: Subject to any disclaimer, the term of this patent is extended or adjusted under 35 U.S.C. 154(b) by 0 days.

(21) Appl. No.: 13/510,890

(22) PCT Filed: Dec. 14, 2010

(86) PCT No.: PCT/IB2010/055799
§ 371 (c)(1),
(2), (4) Date: May 18, 2012

(87) PCT Pub. No.: WO2011/073899
PCT Pub. Date: Jun. 23, 2011

(65) Prior Publication Data
US 2012/0246735 A1 Sep. 27, 2012

(30) Foreign Application Priority Data

Dec. 16, 2009 (EP) .................................... 09252808

(51) Int. Cl.
G06F 9/06 (2006.01)
G07B 15/02 (2011.01)
G06F 21/55 (2013.01)
G07B 15/06 (2011.01)
G06F 12/14 (2006.01)
H04L 29/06 (2006.01)

(52) U.S. Cl.
CPC ............... *G07B 15/06* (2013.01); *G07B 15/02* (2013.01); *H04L 63/123* (2013.01); *H04L 63/1416* (2013.01); *G06F 21/552* (2013.01)

(58) Field of Classification Search
None
See application file for complete search history.

(56) References Cited

U.S. PATENT DOCUMENTS

| 6,308,270 | B1 | 10/2001 | Guthery et al. | |
|---|---|---|---|---|
| 2009/0033510 | A1* | 2/2009 | Izumi et al. | 340/679 |
| 2009/0307487 | A1* | 12/2009 | Movva et al. | 713/156 |
| 2011/0153267 | A1 | 6/2011 | Peeters et al. | |
| 2011/0203003 | A1 | 8/2011 | Peeters et al. | |

FOREIGN PATENT DOCUMENTS

| EP | 1 993 075 A1 | 11/2008 |
|---|---|---|
| JP | 2009-038586 A | 2/2009 |
| WO | 2009/090515 A2 | 7/2009 |

OTHER PUBLICATIONS

Securing Vehicular Communications. Raya et al. IEEE(2006).*
(Continued)

*Primary Examiner* — Venkat Perungavoor
(74) *Attorney, Agent, or Firm* — Pearl Cohen Zedek Latzer Baratz LLP

(57) ABSTRACT

A data processing apparatus (30) comprising: a local source of data (4); a first controller (31); and a tamper-resistant second controller (32) configured to communicate with the first controller, the first controller being configured to control and receive data from the local source of data and from a sensing unit connected to the first controller via a communication interface and to perform a series of calculation operations on the data, wherein the second controller is configured to verify the integrity of a selected subset of the operations performed by the first controller.

12 Claims, 14 Drawing Sheets

(56) References Cited

OTHER PUBLICATIONS

"Trusted Platform Module", retreived from the Internet on May 8, 2012 at http://en.wikipedia.org/wiki/Trusted_Platform_Module, 5 pages.

International Search Report for Int'. Patent Appln. No. PCT/IB2010/055799 (Apr. 1, 2011).

* cited by examiner

DATA PROCESSING APPARATUS

CROSS-REFERENCE TO RELATED APPLICATIONS

This application is a National Phase Application of PCT International Application No. PCT/IB2010/055799, International Filing Date Dec. 14, 2010, which claims priority from European Patent Application No. 09252808.2, filed Dec. 16, 2009, which are incorporated in their entirety herein by reference.

The disclosure relates to a data processing apparatus for use in vehicle telematics systems or smart metering systems, and to methods of operating such an apparatus, for example for use in road pricing.

FIG. 1 illustrates in schematic form a general concept relating to telemetry, in which a user entity 1 has access to a remote device 2, the device 2 comprising a host controller 3 and a local database 4. In this general case, the user or external entity 1 is able to use the device 2, via a two-way communications link 5, to transform some input data into some output data. As well as telemetry, such a system may be apply in other situations such as smart metering, involving remote monitoring of energy usage.

One problem of interest in such a situation is how the external user entity 1 can be confident that the device 1 is indeed producing the correct output for a given input. In other words, the problem is how to protect the integrity of a process running in the device, in particular against tampering attacks.

In considering the above problem, there are three different assets that may be subject to tampering by an attacker 20, as illustrated in FIG. 2. These attacks are:

1. Attacks aiming at modifying the I/O Data itself (arrow 21), either the input data before it is submitted to the device 2, or the output data 6 after it is produced by the device 2;
2. Attacks aiming at modifying the process running in the host controller 3 (arrow 22); and
3. Attacks aiming at modifying the host data stored locally in the database 4 (arrow 23).

Various solutions are available aimed at protecting the integrity of the assets listed above, examples of which include the following:

(1) For I/O Data 6, a typical solution is to use a signature algorithm, in which data is signed at the input by the user entity 1, and is signed back at the output of the device 2 by the host process 3, hence protecting the integrity of the data 6 by allowing detection of any modification, known as tamper-evidence.

(2) Use of a Trusted Platform Module (TPM), a secure cryptoprocessor that can be used to protect the host process through mainly two mechanisms: remote attestation and sealed storage. Remote attestation creates a cryptographic signature of the host process state to prove to a remote entity that the host controller is in a given state. Sealed storage encrypts data in such a way that it can only be decrypted by the host process if it is in the correct state. TPM is mainly used in personal computers, for instance for proving to a remote payment server that no trojans, viruses, key loggers or such-like are present in the computer where the payment will be made. TPM can also be used for Digital Rights Management (DRM) applications.

(3) The use of a 'smart card' is another known solution. A secure smart card typically comprises a highly secure chip embedded in a plastic card. The embedded chip is designed to be very resistant to any tampering attacks, such that it is very difficult to alter or probe the program and data stored in the chip. Smart cards are used for secure payment applications, where money electronic value is stored in the card (an 'electronic purse'), or for secure access control applications, where a secret key giving access to a facility or network is stored in the card (e.g. a SIM card), or for identification application, where a signature key is stored in the card (e.g. an electronic passport).

A disadvantage of TPM is that this is basically static protection, proving only that the controller is in some certified state at some point in time, and is ready to process security sensitive data. TPM does not provide protection against attacks that occur after the certified state has been reached or against hardware tampering attacks. TPM solutions also require deep support from the operating system and host controller.

Smart cards on the other hand offer dynamic protection, i.e. protecting not only the state of the process but also how this state evolves over time, but are inconvenient by requiring specific designs and manufacturing processes. Smart cards also typically have very limited processing power, and are therefore not suitable for all applications.

It is an object of the invention to address one or more of the above problems.

WO 2009/090515 discloses a road toll system comprising a vehicle-mounted unit having a satellite navigation receiver implementing a position tracking function. Routes taken by the vehicle are based on the position tracking information and a sensor for detecting a local vehicle condition independent of the satellite navigation signals. Authenticity of the position tracking information is validated using the sensor information.

In accordance with a first aspect of the invention there is provided a data processing apparatus, as defined by the appended claims.

The apparatus may form part of a vehicle telematics system, wherein the sensing unit is a location sensing unit and the local source of data comprises a source of map data and optionally also a source of fare data, wherein the first controller is configured to control and receive data from the location sensing unit and the sources of map (and optionally the fare data); calculate a location of the vehicle based on data received from the location sensing unit; and optionally calculate a fare based on the calculated location and the data received from the sources of fare and map data.

The sensing unit may be an external device connected to the first controller, for example via a communications interface.

By verifying the integrity of only a selected subset of operations performed by the controller, the system is able to operate efficiently and quickly without sacrificing security.

The second controller is optionally provided as a removable card comprising data for identifying a user of the system.

The second controller is configured to randomly or pseudo-randomly select the subset of operations. In preferred embodiments, the second controller randomly selects one out of a series of location and fare calculations performed by the first controller for verification, but keeps secret which one has been selected.

The second controller is optionally configured to verify the integrity of a selected subset of operations performed by the first controller during one or both of a location calculation operation and a fare calculation operation.

The first controller is configured to record history data derived from the start and finish state of one or more operations and transmit the history data to the second controller. The second controller is configured to verify the one or more operations using the history data.

The second controller may be configured to store history data only for the one selected operation to be verified.

The first controller may be configured to transmit the history data as each operation is performed, and the second controller may be configured to decide whether to store or discard the transmitted history data according to the selection of which operation is to be verified.

The history data may be derived from a hash of the start and finish state of the one or more operations.

The second controller may be configured to indicate to the first controller which history data are to be transmitted after the first controller has sent a hashed result of the operations performed by the first controller.

The data processing apparatus may be incorporated into a metering system, wherein the sensing unit is an energy meter and the first controller is configured to generate energy pricing based on data received from the sensing unit and the local source of data.

In accordance with a second aspect of the invention there is provided a method of operating a data processing system, and in accordance with a third aspect of the invention there is provided a method of operating a vehicle telematics system, also defined by the appended claims.

The second controller optionally provides a signed total to the first controller as an indication of a correct verification.

The second controller randomly or pseudo-randomly selects the subset of operations.

By randomly or pseudo-randomly selecting the particular subset of operations that are to be verified, security is maintained because it cannot be determined which operation carried out by the (non-secure) first controller will be the operation that will be checked by the (secure) second controller. It will not be possible to determine in advance which operation will be subject to verification. Since many hundreds or thousands of operations will be performed by the first controller during a typical journey, the second controller only needs to randomly select a small proportion in order to ensure integrity to all practical purposes, or at least to be able to reliably detect any tampering.

The invention provides the advantage of both TPM and smart card solutions, but in a more cost-effective and flexible manner. The invention allows for dynamic protection of the process running in the device, by protecting not only the state of the process but also how this state is updated over time, and can be applied to any generic purpose host controller without requiring hardware modification of the controller. The invention also only requires the addition of a cheap secure controller such as found in smartcards, and therefore has the advantage that a specific smart card is not necessarily required for each particular application.

Embodiments of the present invention will now be described by way of example and with reference to the accompanying drawings in which.

Aspects of the invention rely on two main principles, outlined as follows:

(1) Protection against tampering relies largely on tamper-evidence or detection, rather than on tamper-resistance of the entire process. In a general aspect, this is achieved by adding a secure tamper-resistant controller next to the host controller in the device, and having this additional secure controller verify on a regular basis that the process running in the host controller has not been tampered with.

(2) In order to reduce the burden on the additional secure controller, the secure controller does not perform a complete verification of all operations, but can select, for example on a random basis, which part(s) of the target process it is going to verify.

Figure 3A:
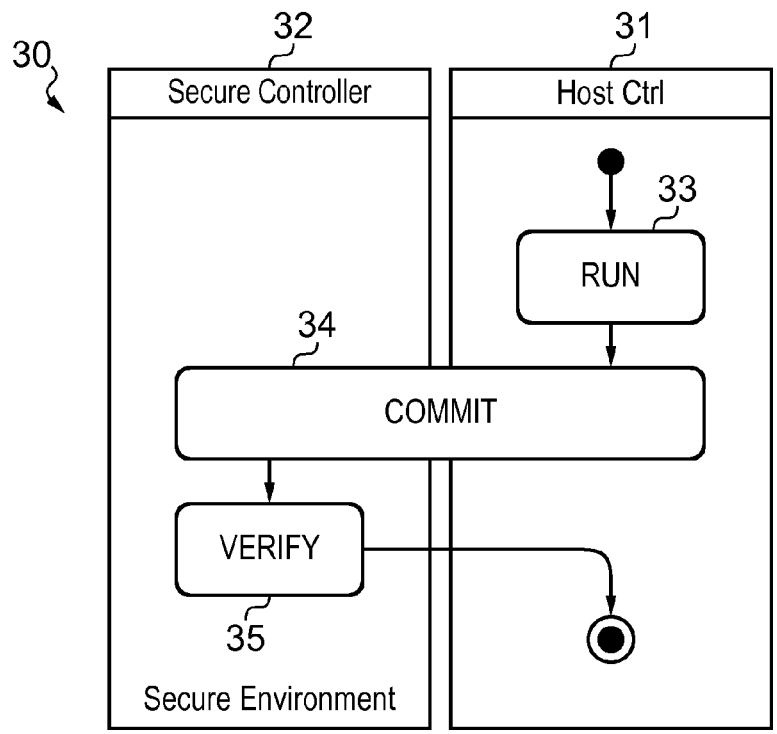
FIGS. 3a and 3b are schematic diagrams of exemplary sequences of operations carried out in a host controller and a secure controller.
Figure 3B:
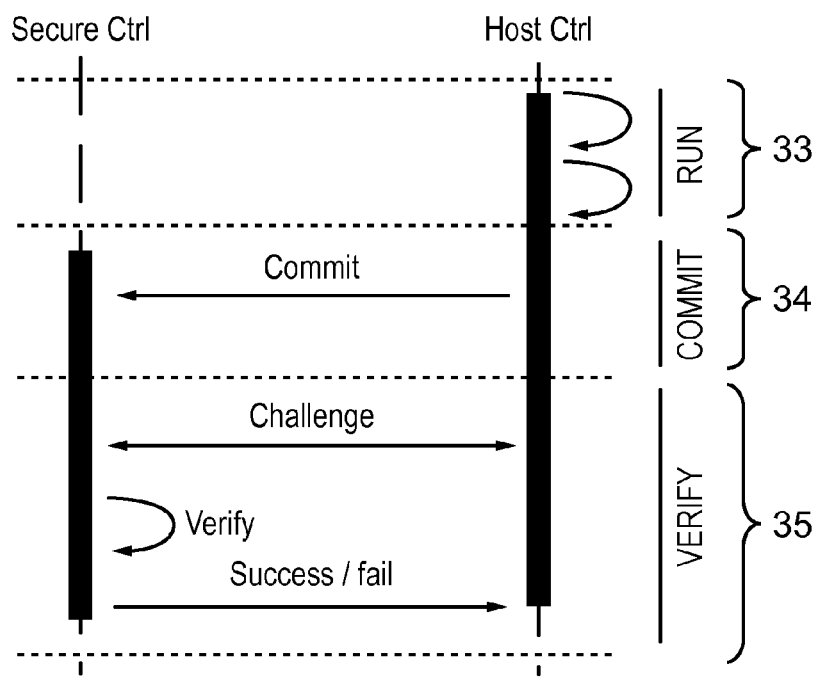

As illustrated in FIGS. 3a and 3b, a device 30 comprising a first (host) controller 31 and a second (secure) controller 32 operating according to the invention can be viewed as operating in three different phases:

(1) the RUN phase 33, where the audited process is executed;

(2) the COMMIT phase 34, where the host controller commits on the result of the audited process and of intermediate steps; and (3) the VERIFY phase 35, based on challenge-response protocol where a selected part of the audited process is verified by the secure controller, preferably as a result of a random selection by the secure controller.

Figure 1:
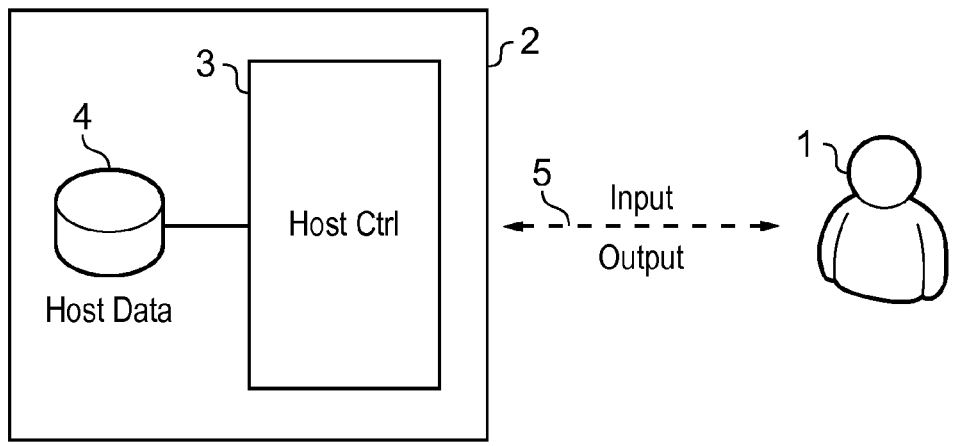
FIG. 1 is a schematic diagram illustrating a telemetry system.
Figure 2:
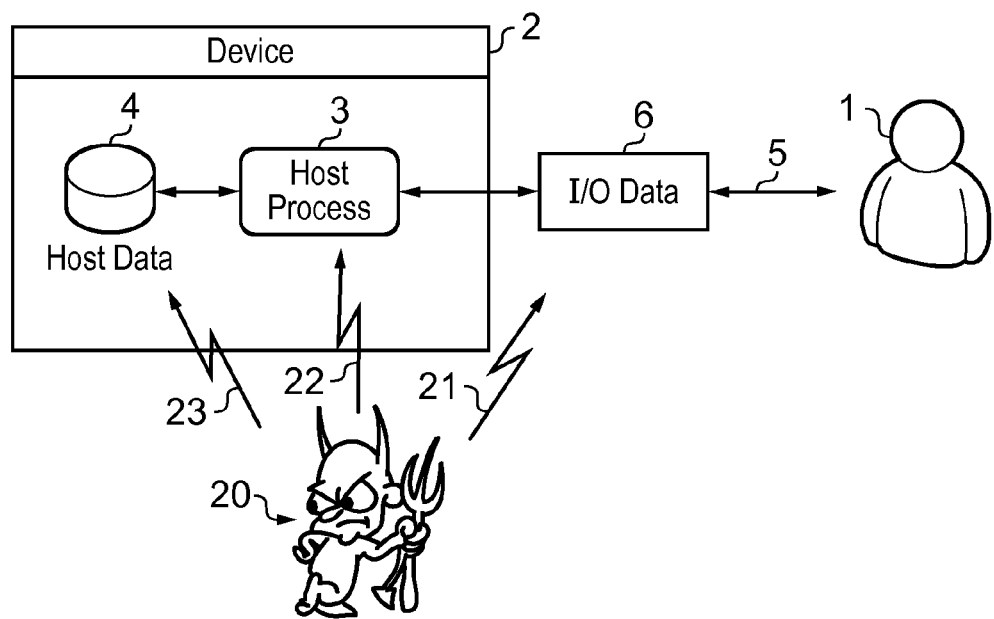
FIG. 2 is a schematic diagram illustrating possible attacks against the system of FIG. 1.
Figure 4:
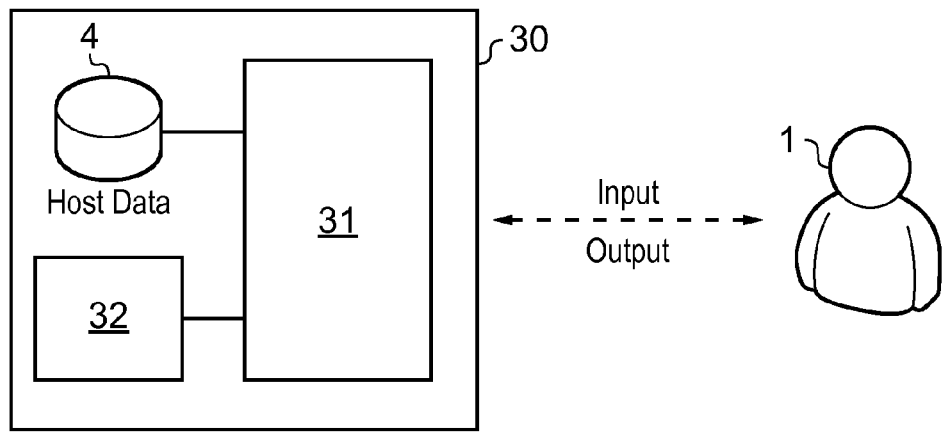
FIG. 4 is a schematic diagram of a telemetry system comprising a secure controller connected to a host controller.

A system operating according to the above is illustrated in FIG. 4, being similar to the system in FIG. 1 but with the addition of a secure, tamper-resistant, controller 32. The secure controller 32 may be of the type found in smart cards.

Figure 5:
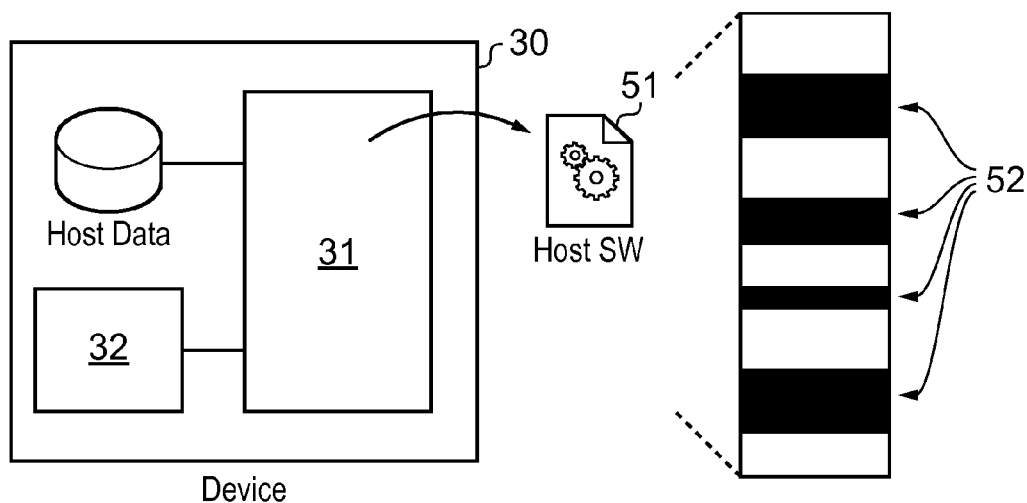
FIG. 5 is a schematic diagram illustrating parts of software onboard the host controller to be protected.

As illustrated in FIG. 5, the host controller 31 contains software 51 that is to be protected and verified by the secure controller 32. In most cases it is not necessary to apply verification to the complete host software, but only to specific sensitive parts 52. For example, low level drivers can typically be ignored, whereas parts of the software dealing with financial transactions must be carefully protected against any possible tampering. In most situations this will lead to the identification of several parts that are independent of each other, and hence can be protected independently. It is then sufficient to consider each part as an independent process, and apply the process of verification to each process separately.

Figure 6:
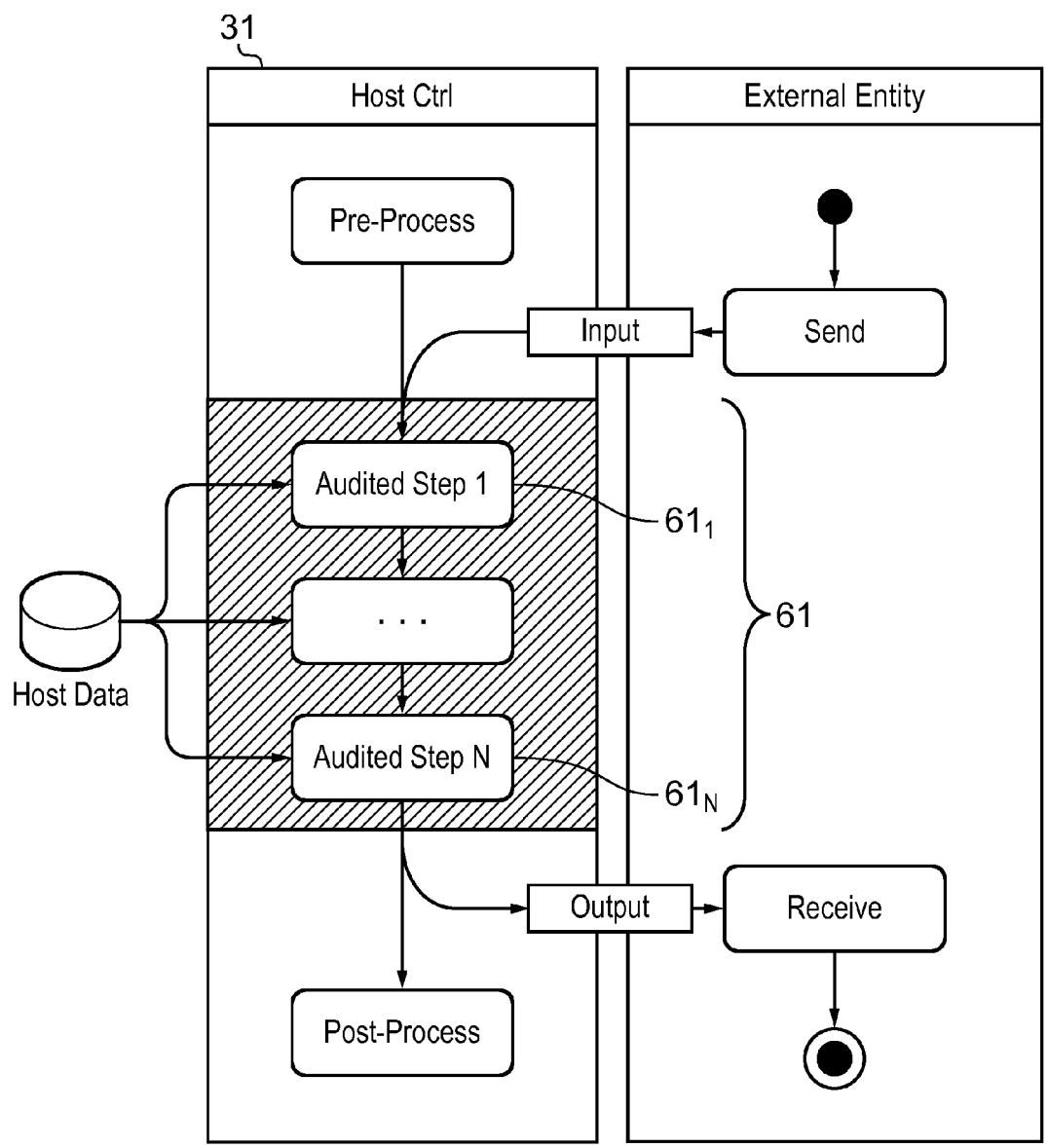
FIG. 6 is a schematic diagram of a telemetry system having audited process steps.

Processes subject to verification are herein termed audited processes. In order to apply the invention, each audited process 61 can be split into several audited steps $61_{1-N}$, as illustrated in FIG. 6. One or more of these steps is randomly selected for verification by the secure controller.

The way the selected audited process is split in intermediate steps, and the number of these steps, is dependent on the type of process to be audited. One way is to cut the process in such a way that each step is only loosely dependent on the previous and next steps, and also so that the size of input state and output state is a minimum. Each step should ideally be of the same or similar complexity so that verification on the secure controller will take more or less the same time, thereby improving efficiency when carrying out operations in parallel. Finally splitting the process in more and hence smaller steps will typically reduce the time needed to verify a single step, but will also reduce the probability of detecting that tampering has occurred during execution of the process on the host controller. Splitting of the process into intermediate steps is therefore a compromise between performance and detection rate.

In the following sections, different modes of execution are illustrated by way of example.

Figure 7:
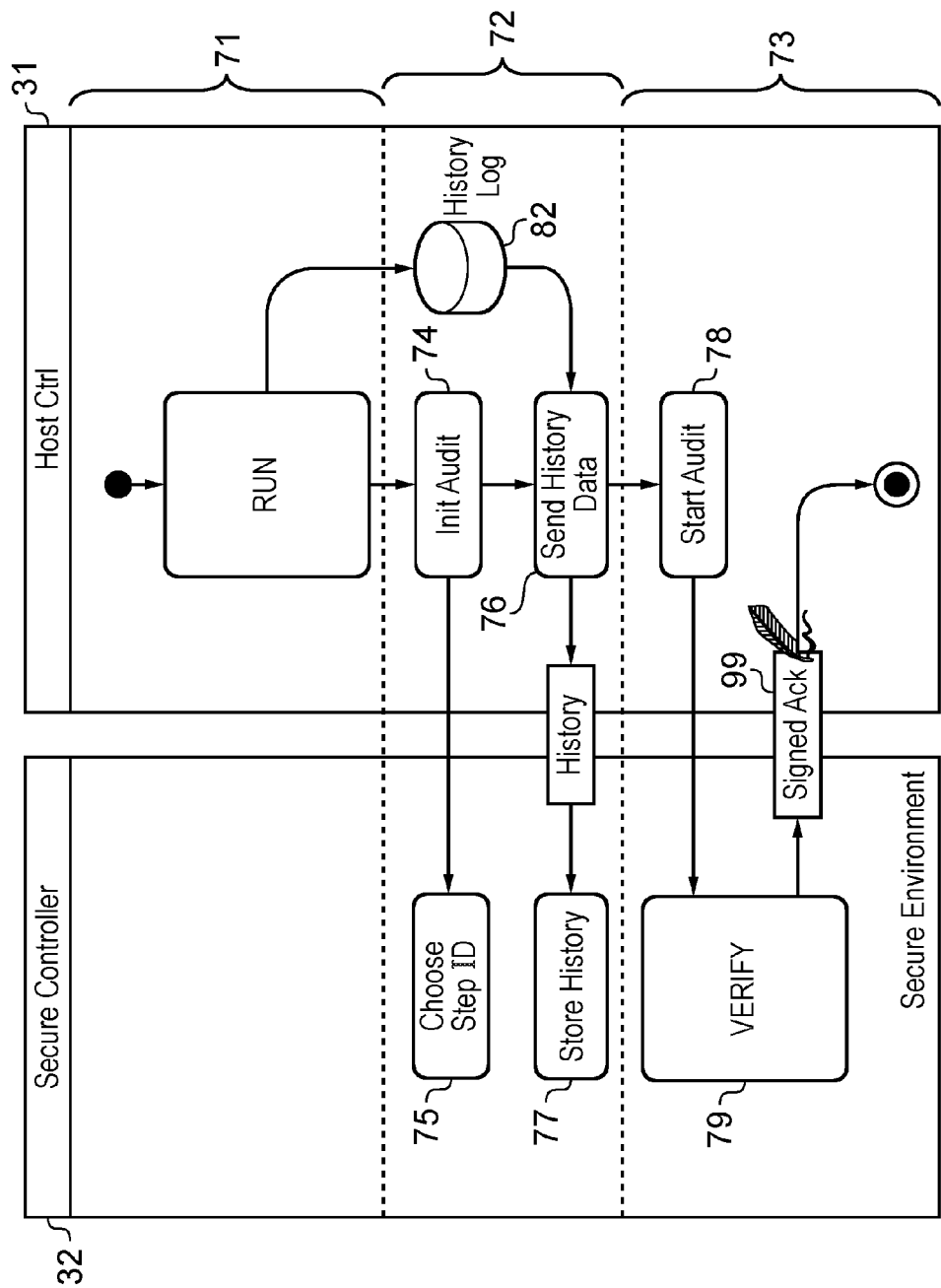
FIG. 7 is a schematic diagram of a device operating according to a sequential mode.

In a sequential mode example, illustrated in FIG. 7, the three phases 71, 72, 73 are run sequentially: the middle COMMIT phase 72 starts after completion of the RUN phase 71, and the VERIFY phase 73 starts on completion of the COMMIT phase 72.

Figure 8:
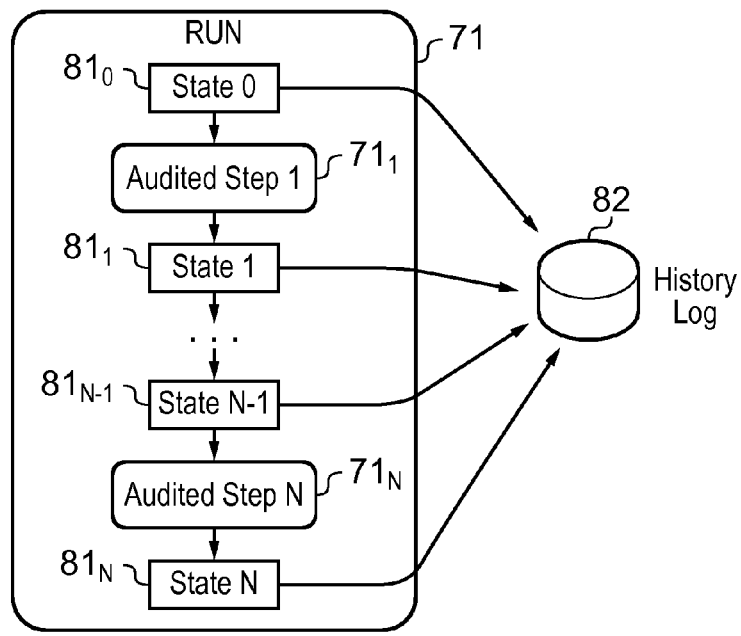
FIG. 8 is a schematic diagram of a sequence of operations in a RUN state of a host controller.

In the RUN phase 71, illustrated in further detail in FIG. 8, the host controller 31 simply executes the audited process normally, but also maintains a stored process execution history log 82, where the input states and output states $81_{O-N}$ for all intermediate steps $71_1 \ldots 71_N$ of the audited process are stored. The history log 82 allows for each step $71_1 \ldots 71_N$ to be replayed without having to replay the entire process from the beginning.

During the COMMIT phase 72, the host controller 31 launches (step 74) the audit process on the secure controller 32. The secure controller 32 then chooses (step 75) which step of the audited process is to be verified, termed herein the Step ID. For security reasons, it is important that the Step ID is kept secret by the secure controller 32 and is preferably chosen randomly (or at least in a non-deterministic way), so that it cannot be readily determined in advance which step the secure controller 32 is going to select.

The host controller 31 then commits on the complete execution history of the audited process. This can be done simply by sending (step 76) the full content of the history log 82 (FIG. 8) to the secure controller 32, which stores (step 77) the history log locally. This can be a simple and efficient solution in the case where the history log 82 is small. For a larger history log, it may be preferable to employ a parallel mode, possibly using one or more hashing operations, described in further detail below.

The VERIFY phase 73 aims at verifying the integrity of the audited process, as executed by the host controller 31.

Once the host controller 31 starts the auditing process (step 78), the secure controller 32 verifies (step 79) that the audited step chosen during the COMMIT phase 72 has been correctly executed.

Figure 9:
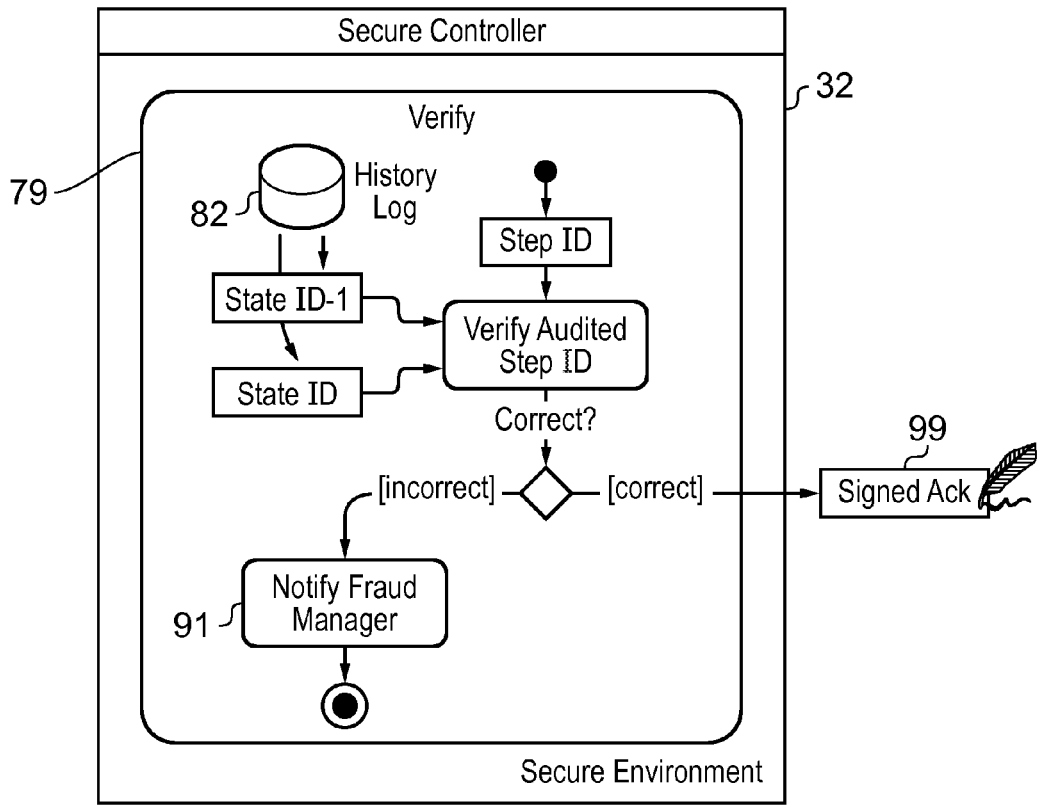
FIG. 9 is a schematic diagram of a sequence of operations in a VERIFY state of a secure controller.

The secure controller 32 may reproduce the chosen step internally, and verify that the same output is obtained to that sent by the host controller 31, by checking the result against relevant portions of the history log 82. This is shown in FIG. 9, which illustrates a simplified example where the secure controller makes a choice between one of two possible steps to be audited. Given the Step ID generated previously, the verify operation 79 proceeds to audit a selected Step, using the relevant input state from the history log 82, and determines for the relevant case whether the result corresponds with the corresponding output state from the history log.

In case of failure, the secure controller 32 notifies an internal fraud manager (step 91). The main role of the fraud manager is to maintain a list of all verification failures. The system is preferably configured such that any notification to the fraud manager is always forwarded, either instantly or at regular or random intervals, to the external entity 1 (FIG. 4) in a secure way, so that the external entity can then take appropriate action. For example, the secure controller 32 may contain a secure state coded as a flag register. One or more bits of this flag register can be used to code the state of the verification process. If this register is always included in all signatures generated by the secure controller, an external entity or server is always notified of the state of the secure controller.

In case of success, the secure controller 32 sends a successful audit notification to the host controller 31. The successful audit notification can be sent to the host controller 31 by means of a signed acknowledgement 99. This acknowledgement can be used by the host controller to prove to the external entity 1 that the process has been successfully audited, and that the external entity can then trust the result. Many methods exist for computing such an acknowledgement. As an example, the secure controller 32 may hash the output state of the last secure step (as received during the VERIFY step 79), and then sign this result using a symmetric cryptographic signature scheme such as AES (Advanced Cryptographic Standard).

A successful audit may also result in the granting of temporary access to some services or resources on the secure controller that require higher privileges, such as access to restricted information in secure storage, access to a payment application or generation of an authentication token. The host controller 31 may then need to be regularly audited in order to maintain the availability of the restricted services/resources.

In some cases, it may be easier to verify that the given input state and output state satisfy well defined pre- and post-conditions rather than executing the step itself, as in the example above. For example, if the process computes the square root of a number, it is actually easier to verify that the squared result is indeed equal to the input than to perform the square root extraction.

Figure 10:
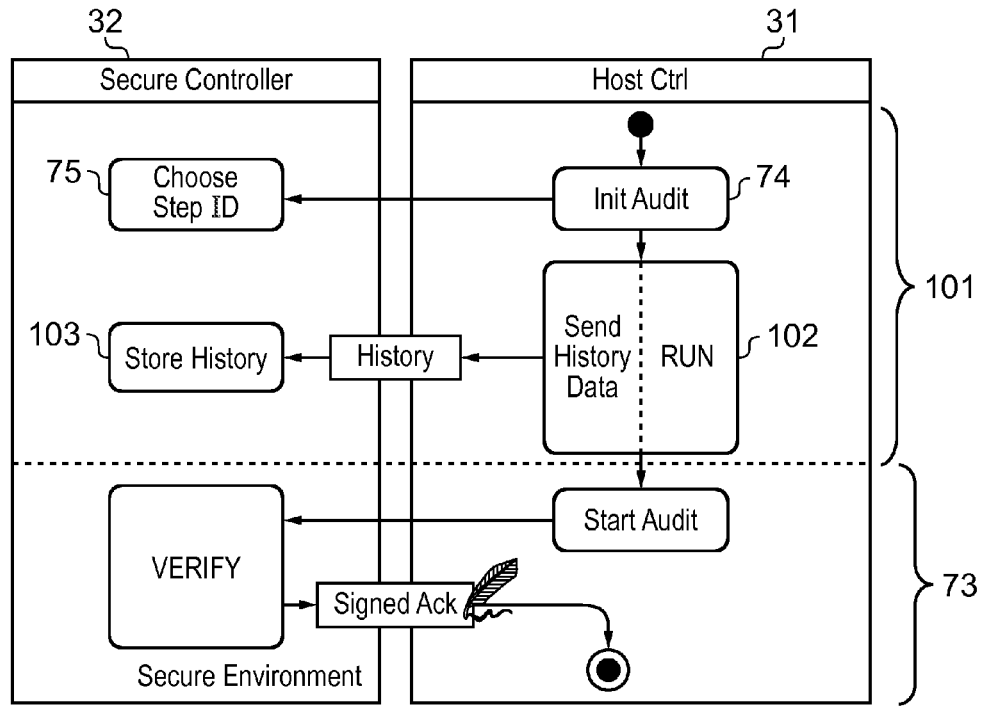
FIG. 10 is a schematic diagram of a device operating according to a parallel mode.
Figure 11:
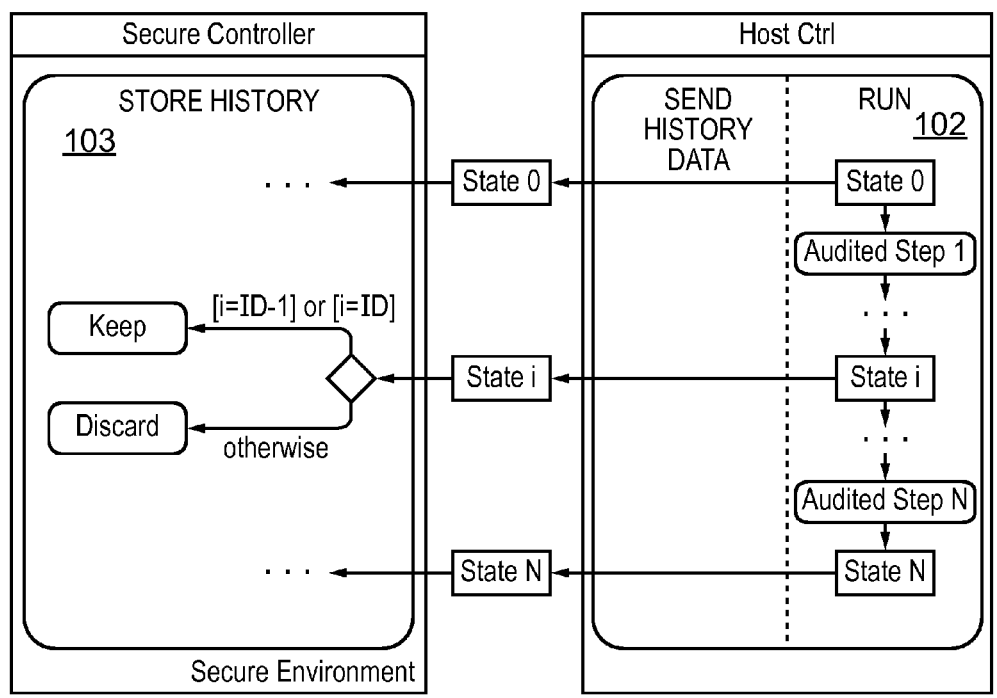
FIG. 11 is a schematic diagram of a sequence of operations in RUN and STORE states in a parallel mode.

FIGS. 10 and 11 together illustrate an embodiment in which certain operations in the host and secure controllers 31, 32 are carried out in parallel. This improves the overall speed performance by running the RUN and COMMIT phase 101 simultaneously. After initializing the auditing process (step 74), causing the secure controller 32 to choose the Step ID (step 75), the host controller 31 sends the COMMIT data to the secure controller while it is still executing the audited process (step 102), and the secure controller 32 stores the relevant part of the history log as it is received (step 103), discarding the parts that relate to a non-chosen Step ID. The result of this is that this part of the verification process can be carried out with almost no overhead if the host controller 31 is equipped with DMA (Direct Memory Access) sub-controllers or similar that allow for data to be sent to external devices without intervention from the main CPU. This way the audited process can be run almost as fast as compared to an unaudited implementation. Also the overhead delay after the RUN phase is considerably decreased by operating in parallel, since any delay is now only due to the execution of the subsequent VERIFY phase 73, which can be the same as that described above.

A variant on the above parallel mode embodiment is illustrated in FIG. 10. This is similar to the sequential mode embodiment of FIG. 7, with two main differences. Firstly, the host controller 31 initializes the audit mechanism (step 74) on the secure controller 32 immediately prior to executing the audited process, causing the secure controller 32 to randomly and secretly select a Step ID (step 75). Secondly, the initial, intermediate and final states obtained during execution of the audited process (step 121) are not logged by the host controller 31, but are instead sent immediately to the secure controller 32. If the host controller 31 has a DMA controller or similar, this communication can be carried out in parallel with execution of the audited process, and consequently with almost no impact on the execution speed of that process.

The secure controller 32 keeps the data if the state is either the input state or the output state of the step that the secure controller chose to verify. If not, the data is simply discarded. However this must be done in such a way that the host controller cannot tell whether the data has been kept or discarded, so that the host controller 31 has no insight into the Step ID value. In order to maintain cohesion of the process execution chain, it is important not to split intermediate states in 2 parts: one that would contain the output of the previous step, and another that would contain the input of the next step. Otherwise the attacker would be able to easily change the input of any step without detection.

In this embodiment, the verification phase is executed like in the sequential mode embodiment of FIG. 7, described above. The only difference in this case is that the secure controller does not have to select which state data to use for the verification process since this has been done already during the COMMIT phase.

When the size of intermediate states in the audited process is very big, it becomes advantageous to limit the amount of data transferred between the host and secure controller for performance reasons. A solution consists in modifying the COMMIT phase in order not to send the complete history log, but only the 2 states that are needed by the secure controller. The commitment part is done using a cryptographic hash on the complete history log. This hash allows the host controller to commit on the complete history log without actually sending it completely.

Figure 12:
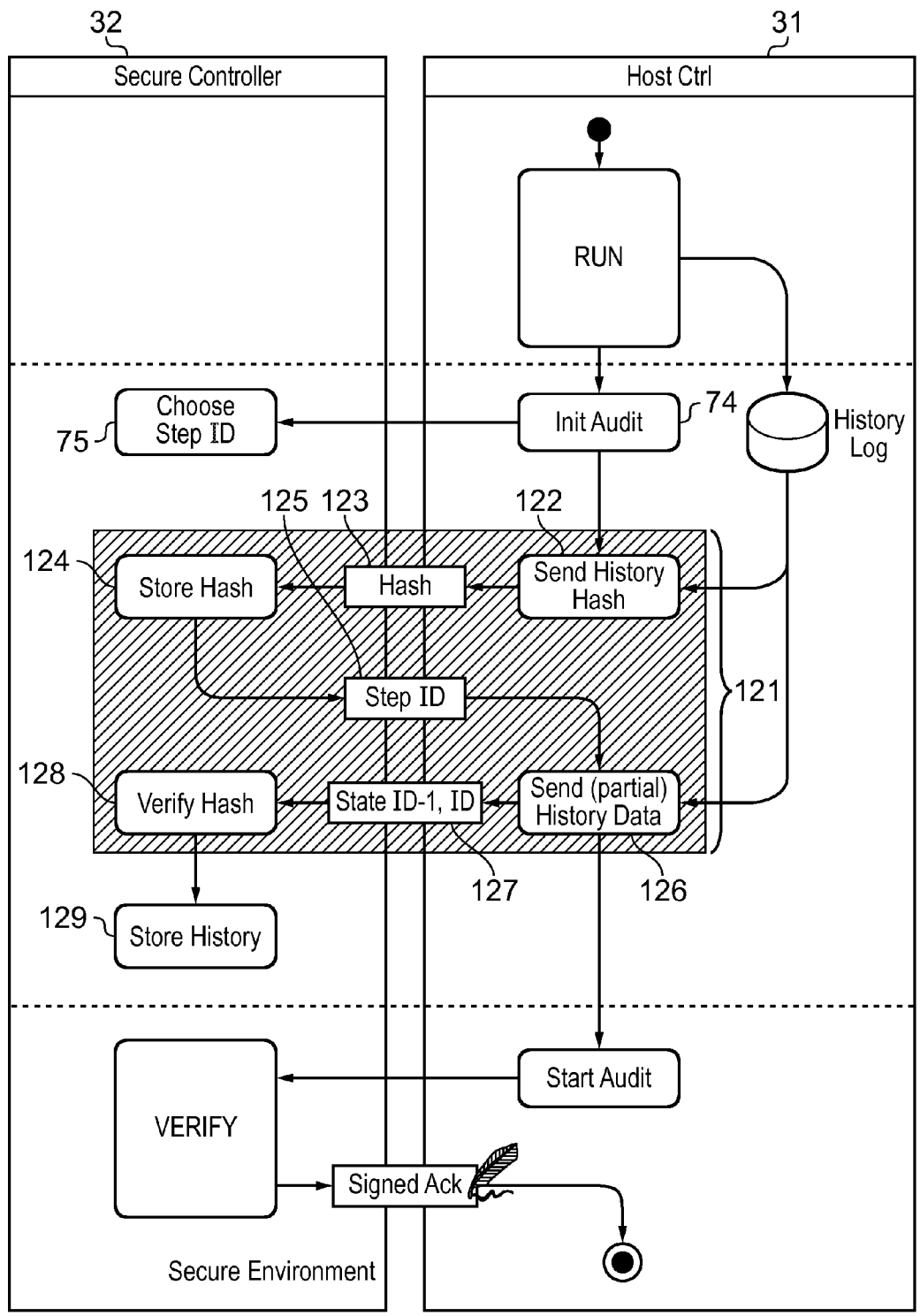
FIG. 12 is a schematic diagram of a sequence of operations in a device operating according to a sequential mode incorporating hashing operations.

This solution can be applied to both sequential and parallel mode embodiments. In the sequential mode embodiment (FIG. 12), only the COMMIT phase is changed compared to the standard sequential mode embodiment of FIG. 7. The RUN and VERIFY phases are the same.

In the COMMIT phase, an extra exchange is added so that the secure controller 32 can tell the host controller 31 which step it is going to verify. But before transmitting the chosen Step ID, the host controller 31 must first commit on the complete execution history by hashing the content and sending the hash result (steps 122, 123) to the secure controller 32. This way, it will not be possible for a hacked host controller 31 to change the content of the history log if it happens that the secure controller wants to verify the part of the audited process that has been hacked during the RUN phase. Also the hash is computed such that it is not possible for the host controller 31 to transmit the input and output state data corresponding to a different Step ID, without this being detected by the secure controller 32.

Figure 13A:
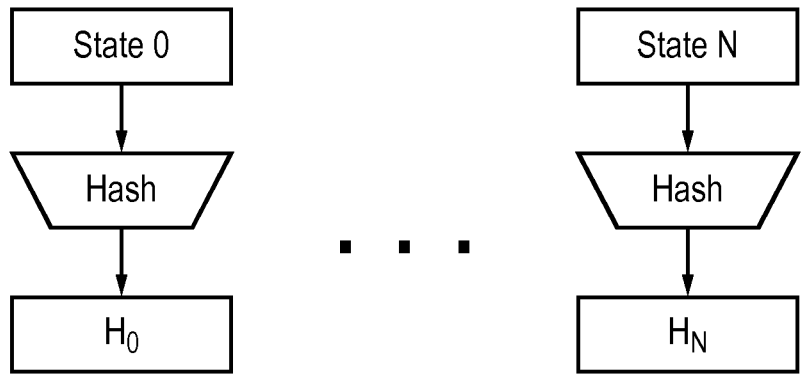
FIG. 13a is a schematic diagram illustrating a simple hashing scheme.

Several hash schemes described in the state of the art can be used. A simple yet efficient one is detailed below and illustrated in FIG. 13a. This simply consists of hashing each state (State 0 . . . State N) separately, and sending the hash result (H0 . . . HN) for each state to the secure controller.

In this scheme, if the audited process consists of N steps, N+1 hashes are sent to the secure controller. For security reason the hashes must be computed using a strong cryptography hash algorithm, such as SHA-1, SHA-256 or similar. If $H_{len}$ is the size in bytes of the hash result, then $(N+1)H_{len}$ bytes are sent to the secure controller 32 using this simple scheme. For example, for an audited process consisting of 10 intermediate steps, using an SHA-1 hash algorithm results in an overhead of 220 bytes.

The secure controller stores the hash(es) corresponding to the input and output state of the step it is going to verify (FIG. 12: step 124), discards the other ones, and replies with the Step ID of the chosen step. All this must be done in such a way that the host controller cannot guess the value of the chosen step ID.

On reception of the Step ID (125), the host controller sends the data corresponding to the input and output state of the chosen step (steps 126, 127), which are then stored by the secure controller.

Finally the secure controller verifies the integrity of the received data (step 128). The secure controller hashes the data of the received states, and compares each result with the corresponding hash result sent earlier by the host controller (in step 123). If the hash verification fails, the internal fraud manager is notified (as described in the verify phase of the embodiment illustrated in FIG. 9, described above). If the verification succeeds, the relevant history is stored (step 129) and the state hashes can be completely discarded. The execution then proceeds with the VERIFY phase as before.

Figure 13B:
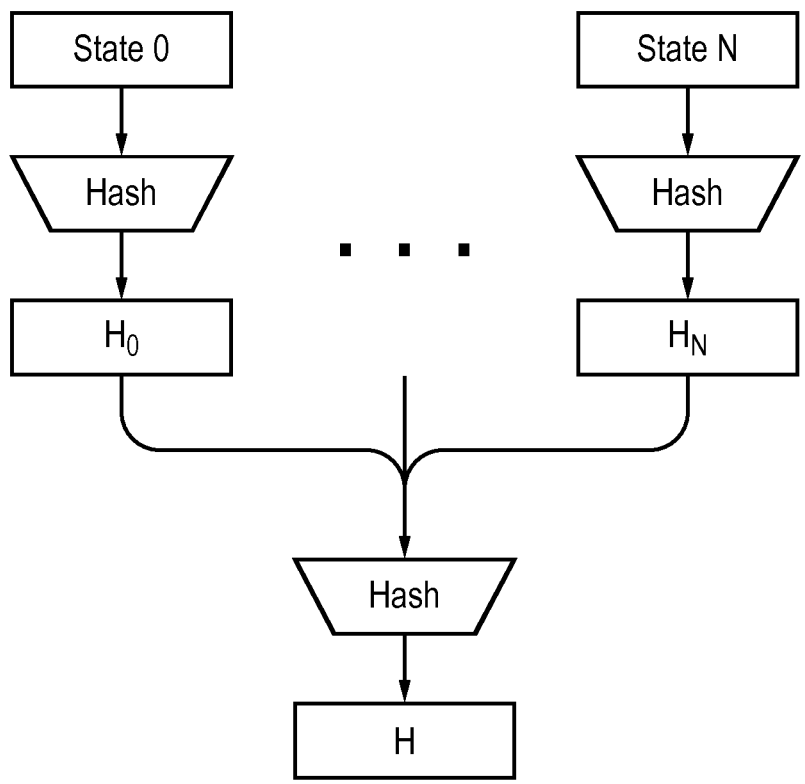
FIG. 13b is a schematic diagram illustrating an alternative hashing scheme.
Figure 14:
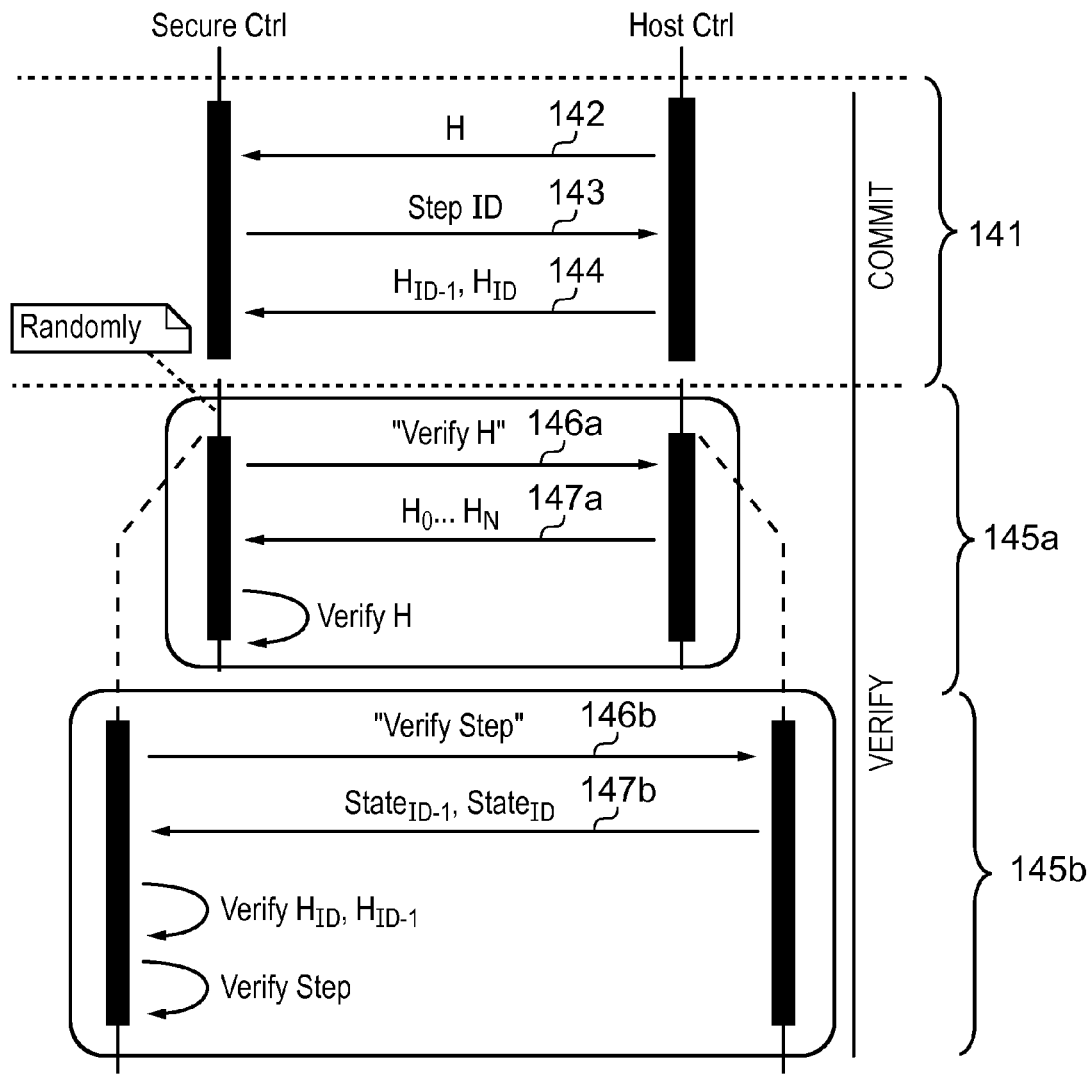
FIG. 14 is a schematic diagram of a sequence of operations in a secure controller and a host controller incorporating hashing operations.

In an alternate hashing scheme to that describe above, the number of hash results sent to the secure controller can be reduced to only 3, independent of the number of steps in the audited process. This principle is illustrated in FIG. 13b, which shows the additional hashing step resulting in a global hash result H, and in FIG. 14 which shows an exemplary sequence of communication operations between the host and secure controller. In the COMMIT phase 141, the host controller computes an additional hash H over a byte string made of the concatenation of all state hashes (H0 . . . HN). At the start of the COMMIT phase 141, the host controller sends the value of that overall hash to the secure controller (step 142), to which the secure controller replies with the Step ID that will be verified (step 143). The host controller completes the COMMIT phase by sending the intermediate hashes $H_{ID-1}$ and $H_{ID}$ corresponding to the input and output states of the step to be verified (step 144).

In the VERIFY phase 145a, 145b, to protect the integrity of the intermediate hashes $H_{ID-1}$ and $H_{ID}$ sent during the COMMIT phase, the secure controller must first verify that the overall hash H has been correctly computed by the host controller. However instead of doing this systematically, which would require the host controller to send all intermediate hash results H0 . . . HN, the secure controller will consider the computation of the global hash H as an additional virtual step of the audited process that can be verified on a random basis. So at the start of the Verify phase, the secure controller chooses randomly whether to proceed normally with the verification of the chosen step (verification sequence 145b), or whether to verify the integrity of the global hash computation step (verification sequence 145a), and notifies the host controller accordingly. In the first case 145b, the host controller sends the data corresponding to the input and output state of the selected step (step 146b), and the Verify phase proceeds as usual, with the host controller returning the relevant states (step 147b). In the second case 145a, the secure controller requests all hash results (step 146a) and the host controller returns all intermediate hash results H0 . . . HN (except for $H_{ID-1}$ and $H_{ID}$, which were previously sent), and the secure controller verifies whether the global hash sent by the host controller is correct. The success or failure is handled in a similar way to that described above.

Using the above scheme, it is not necessary to send all state hashes to the state controller, thereby reducing significantly the communication overhead overall without significantly compromising security.

Figure 15:
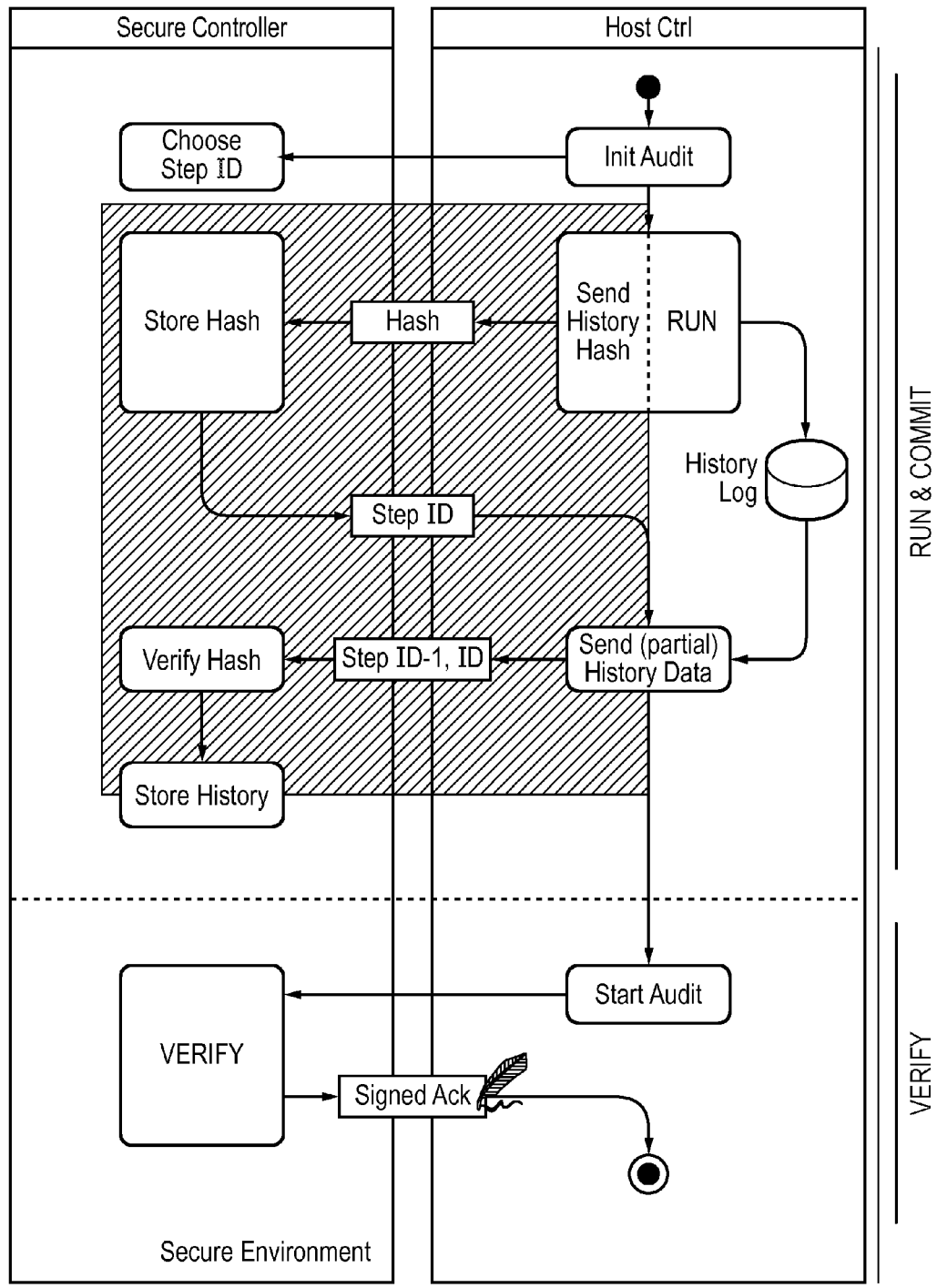
FIG. 15 is a schematic diagram of a sequence of operations in a device operating according to a parallel mode incorporating hashing operations.
Figure 16:
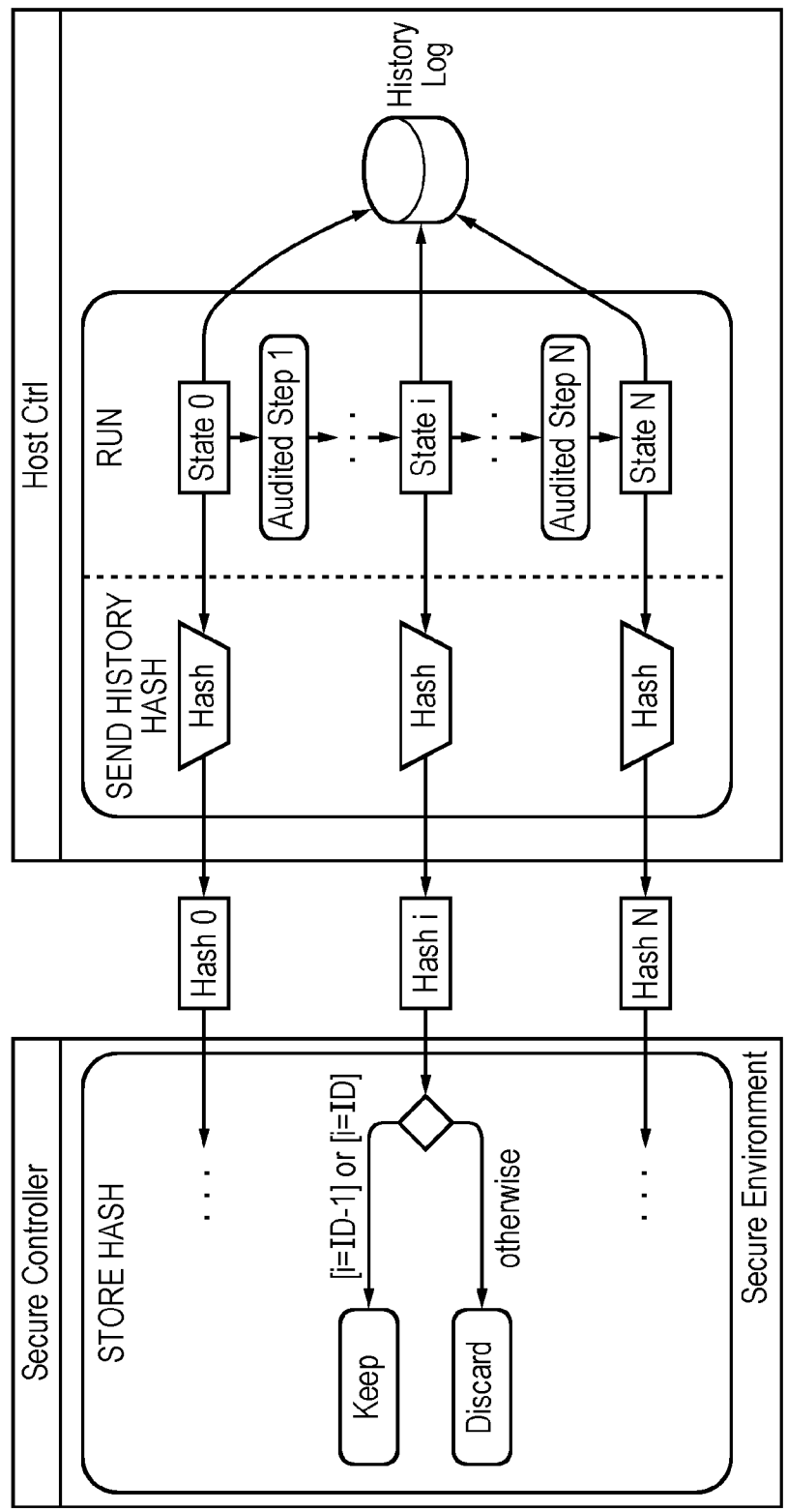
FIG. 16 is a schematic diagram of a sequence of operations of RUN and STORE states for a device operating according to a parallel mode incorporating hashing operations.

In a parallel mode embodiment using hashing operations, the main differences are that the hash committing part is done simultaneously with execution of the audited process. The actual transmission of state data is still done afterwards. This is illustrated in FIGS. 15 and 16. The operations involved are similar to those of the sequential hashing embodiment illustrated in FIGS. 12 and 13, but with the hashing operations for each step being performed and transmitted to the secure controller while the steps are being carried out. The main advantage of this parallel mode embodiment is that a more complex hashing scheme is not necessary since the hash transmission is done in parallel with process execution. However it requires that the secure controller is permanently reachable by the host controller.

Figure 17:
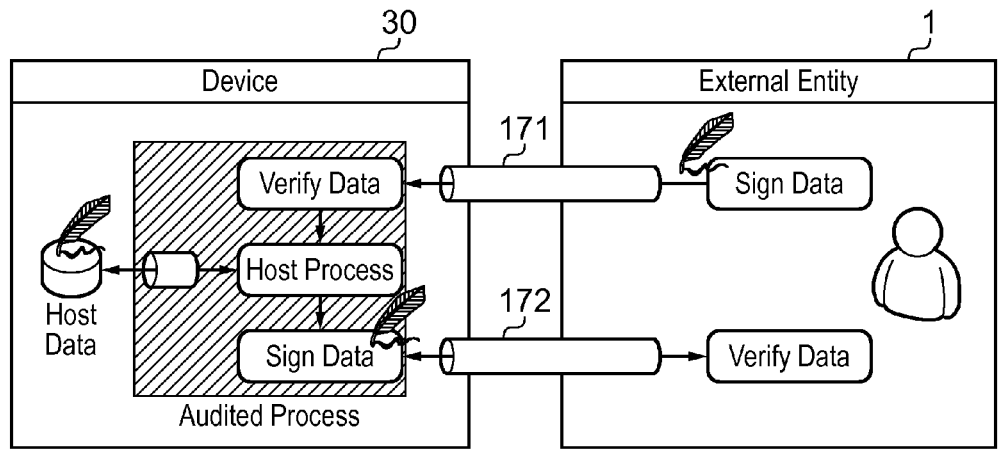
FIG. 17 is a schematic diagram of a telemetry system incorporating data integrity protection using data authentication.

The mechanisms described above protect the processes running inside the device against tampering attacks. These process do not necessarily protect the integrity of data received from or sent to the external entity 1 (FIG. 4), nor do they protect the integrity of the host data. Data authentication may therefore be necessary in some embodiments in order to make sure that the correct process has been applied to the correct data. One way of doing this is by adding a secure channel between the device 30 and the external entity 1, and extending application of the invention to the sub-processes managing this secure channel. In addition, any database stored in the host can be augmented with authentication data that allows for verification of whether the data in the database has been tampered with. This is illustrated in FIG. 17. A transmission channel 171 from the external entity 1 to the device 30 is secured by the external entity signing any data that is to be sent to the device 30, and a transmission channel 172 from the device 30 to the external entity is secured by the device 30 signing any data that is sent to the external entity 1.

When data authentication is used, all input data or host data sent to the secure controller in the device 30 is augmented by data authentication information to allow the secure controller to verify the integrity of the data that were not derived by the process to verify.

Also, when the Verify phase completes successfully, the secure controller signs the output generated by the host process so that to notify the External Entity 1 that the host process has been successfully audited by the secure controller.

This embodiment has two main variants regarding how the input data sent by the External Entity 1 to the device 30 is handled. In a first variant, the integrity of input data is always verified by the Secure Controller. The Secure Controller therefore informs the Host Controller whether the input data has been tampered with. To avoid the need to transmit data twice, the audit process can be initialized before doing this integrity check, because the secure controller may already store the input data that will be used by the audited step.

In a second variant, the Verify Data step may be subject to random verification by the secure controller. The Commit phase is carried out as usual, and whenever the Verify phase requires all or part of the input data to be sent from the External Entity, the input authentication data are sent along.

The following simple computation example is intended to illustrate how the invention can be applied to protect a process that involves a simple computation chain such as the addition of multiple terms. This can be seen as a simplified version of the computational steps necessary to derive a position from a GNSS signal, or the steps necessary to derive a fare from a series of recorded positions. Consider the following addition of 4 terms:

$$R=A+B+C+D$$

According to the invention, the external entity 1 provides the device 30 with the value of the 4 variables A, B, C and D, and expects the device to return the correct value R, which is the sum of these 4 values. To protect the integrity of these 4 input values and of the result, the external entity and the secure controller within the device share a common signature scheme S.

The sum computation is done by the host controller in 3 subsequent steps: first compute the sum $R_{AB}=A+B$, then the sum $R_{ABC}=R_{AB}+C$, and finally the result $R=R_{ABC}+D$.

In the following example the parallel mode is applied, i.e. where the host controller transmits the states at each stage to the secure controller.

The external entity first signs the input data in order to protect their integrity, and sends the input data and signature to the host controller, as shown in the table below.

| Secure Ctrl | Host Ctrl | | External Entity |
|---|---|---|---|
| | ←A, B, C, D, $S_{ABCD}$ ← | | Input: A, B, C, D Compute signature $S_{ABCD}$ |

The host controller then initializes the audit process, which causes the secure controller to choose one step among the 3 sub-steps needed to compute the sum.

| Secure Ctrl | Host Ctrl | External Entity |
|---|---|---|
| Randomly choose step ID in [1, 2, 3] | ← | Initiate audit |

Before starting the process Run phase, the host controller asks the secure controller to verify the integrity of the input data. The secure controller also keeps the input data that will be needed later on to verify that the chosen sub-step has been correctly carried out by the host controller.

| Secure Ctrl | | Host Ctrl | External Entity |
|---|---|---|---|
| if ID = 1, keep A, B if ID = 2, keep C if ID = 3, keep D Verify signature $S_{ABCD}$ | ←A, B, C, D, $S_{ABCD}$ ← _ok/nok→ | | Verify data integrity |

If the data integrity verification was successful, the Run & Commit phases start. Each sub-steps are executed by the host controller, and each intermediate result are submitted to the secure controller. Again, the secure controller keeps the data necessary for the upcoming Verify phase. The final result is always kept.

| Secure Ctrl | Host Ctrl | External Entity |
|---|---|---|
| if ID = 1 or 2, keep $R_{AB}$ | ←$R_{AB}$__ | (if ok) $R_{AB} = A + B$ |
| if ID = 2 or 3, keep $R_{ABC}$ | ←$R_{ABC}$__ | $R_{ABC} = R_{AB} + C$ |
| Always keep R | ←R__ | $R = R_{ABC} + D$ |

After completion of the Run phase, the host controller starts the audit phase. The secure controller has all the data necessary to verify that the chosen step has been correctly executed by the host controller. If the verification is successful, the secure controller signs the final result and sends it to the host controller. This signature along with the final result is sent to the external entity, which verifies the signature on the result.

| Secure Ctrl | Host Ctrl | External Entity |
|---|---|---|
| if ID = 1, verify $R_{AB}$ | ← | Start Audit |
| if ID = 2, verify $R_{ABC}$ | | |
| if ID = 3, verify R | | |
| (if success) Compute signature $S_R$ | __ok + $S_R$/ nok → | Send signed response __R + $S_R$/ nok → | (if ok) Verify signature $S_R$ Output: R |

In this example, it can be seen that the secure controller only performs one of the steps of the complete process, which is selected on a random basis. An attacker intending to tamper with the computation process performed in the host controller can only do so by changing the value of the intermediate results $R_{AB}$, $R_{ABC}$ and R since other values are protected by the signature scheme. The rate of detection depends on number of intermediate value being tampered, and the attacker's best strategy would be to only change the value of the final result R, and to hope that the secure controller has picked an ID≠3. So we see that the computation cost on the secure controller has been divided by 3, and that no matter what the attacker does, any tampering on the host controller side will be detected with a probability of at least ⅓ for each execution of the process. Changing both the value R and $R_{ABC}$ in order to make the step 3 looks valid to the secure controller is not a better strategy because the secure controller will detect tampering if it chooses ID=2. This shows the importance of hiding the choice of the step ID until completion of the commit phase since it prevents the attacker from being able to adapt his tampering accordingly.

Finally, it is important to observe that the input and intermediate values are only sent once to the secure controller. Sending them twice as illustrated in the table below would be a mistake and could actually break the security guarantee.

| Secure Ctrl | Host Ctrl | External Entity |
|---|---|---|
| if ID = 1, keep A, B, $R_{AB}$ | ←A, B, $R_{AB}$__ | (if ok) $R_{AB} = A + B$ |
| if ID = 2, keep $R_{AB}$, C, $R_{ABC}$ | ←$R_{AB}$, C, $R_{ABC}$__ | $R_{ABC} = R_{AB} + C$ |
| if ID = 3, keep $R_{ABC}$, D | ←$R_{ABC}$, D, R__ | $R = R_{ABC} + D$ |
| Always keep R | | |

The idea in the above (potentially incorrect) implementation is to send for each step the complete input and output states. This looks innocuous at first sight, but if the secure controller does not perform additional verification compared to the first implementation above, this is a clear break of the protection.

Indeed, consider that the secure controller only uses the values as they are submitted by the host controller for a given step, and ignore the duplicates submitted for the other steps or for the verification of the input data integrity. In that case, the attacker is free to change the value R to his will, and adapt the $R_{ABC}$ submitted in the 3rd step such that the sum $R=R_{ABC}+D$ is correct. The secure controller has then no way to detect the tampering, and hence will always sign the fraudulent value R. Alternatively, the attacker may simply use different values for A,B,C,D while still computing the sum correctly. If the secure controller does not verify that the values submitted at each step for A,B,C and D are still the same as the one submitted for the verification of the signature $S_{ABCD}$, this attack will not be detected, and an incorrect result will always be signed by the secure controller.

To fix this problem of duplicated values, one has to observe that the protection of the chain computation relies on the preservation of the dependency chain between the values submitted to the secure controller, and that submitting duplicated values without further protection breaks that dependency chain. Actually one can consider that the duplicated values are actually the result of an extra virtual duplication step that must also be verified on a random basis in order to maintain the security guarantee of the invention. If that's not the case, the attacker is then always free to tamper that duplication step without being noticed. The verification in this case is simply to verify that the duplicated variables have always the same values.

The most efficient solution however is to avoid sending duplicated values altogether.

The invention can be applied to any process tree, and the above is merely provided as a generalization in the form of a simple case of a computation chain.

The following example illustrates how the invention can be applied to a complex application such as road tolling.

The purpose of road tolling is to compute a tolling fee for road usage by a vehicle. The tolling scheme defines how the fee must be computed, which usually depends on the type of roads, the distance traveled on these roads and also the time at which the travel occurred. The information describing the tolling scheme is contained in a database, herein termed a tolling scheme database. This database contains at least a detailed map of the roads covered by the tolling scheme, as well as fare formulas for each road.

There are different variants of road tolling implementations. In the variant considered here (termed "superfat client on-board unit"), the vehicle enrolled in the tolling scheme is equipped with an on-board unit (OBU) that records the position of the vehicle from information derived from a GNSS receiver, and computes the tolling fee based on information stored in the tolling scheme database. The OBU aggregates the tolling fee for each vehicle trip, and sends at regular intervals the aggregated fees to the road tolling scheme server. The road tolling scheme server is responsible for collecting the fees from all vehicles participating to the scheme and carrying out billing operations.

Figure 18:
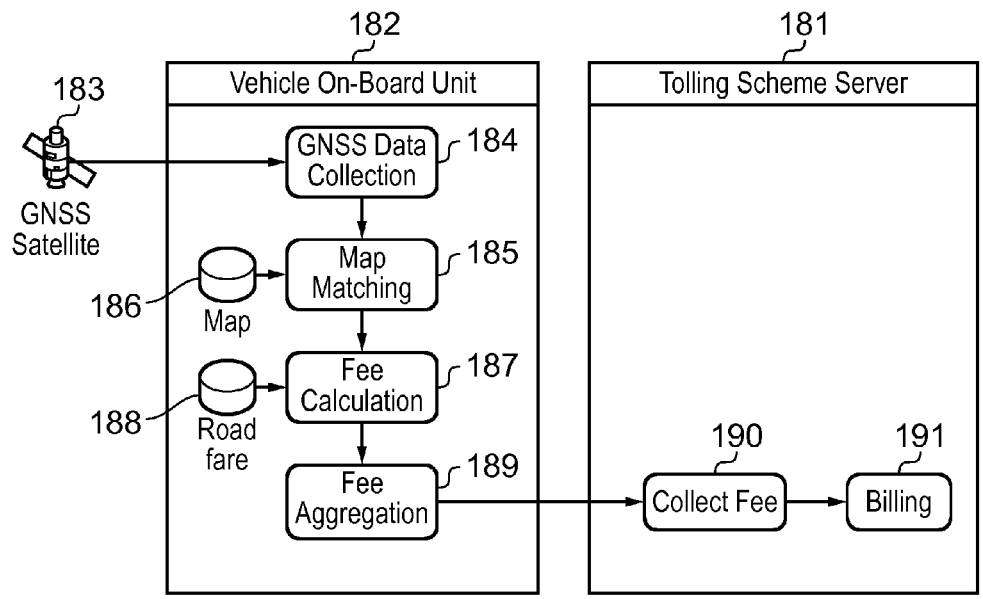
FIG. 18 is a schematic diagram illustrating a road tolling scheme system.

FIG. 18 is a schematic diagram illustrating an arrangement of a road tolling scheme, comprising a tolling scheme server 181 (corresponding to the external entity 1 of FIG. 1) and a vehicle on-board unit 182 (corresponding to the device 2 of FIG. 1), the vehicle OBU 182 receiving positional data from a GNSS satellite 183. The OBU receives and collects GNSS data (step 184) from the GNSS satellite (which will in practice be a collection of satellites, typically at least 3 different satellites and commonly at least 4). The data is matched (step 185) against a map database 186, a fee is calculated (step 187) by reference to a road fare database 188 and a fee is aggregated (step 189) based on a sequence of sections traveled. The aggregated fee information is transmitted to the tolling scheme server 181, which collects the fee information (step 190) and calculates a bill (step 191) for the vehicle.

The processing carried out by the vehicle OBU 182 can be made more secure through the addition of a lightweight secure element, for example in the form of a removable card comprising a secure controller operating according to the invention as described above. An embodiment of the operation of such a system is described in further detail below, with reference to FIG. 19.

A first security issue in road tolling applications relates to protecting and guaranteeing the integrity of the GNSS data used by the OBU in determining positional data. A possible attack would be to use an external GNSS emulator to inject fake GNSS data in the OBU. If by doing this an attacker can trick the OBU to use GNSS data corresponding to roads that have a lower fare than those actually taken by the vehicle, this leads to a clear financial advantage for the attacker. One countermeasure in this case would be to establish an authenticated channel between the GNSS satellites and the OBU. This channel would provide source authentication and data integrity protection that would prevent any such tampering attack. The use of such channels is known, but these tend to be reserved for military applications (in the case of the US GPS system) or require the operator to pay a subscription fee (in the case of the European Galileo).

An alternative countermeasure that may be applied in road tolling systems is to rely on road-side units (RSU) that detect the passage of cars and establish a short-range communication channel with the OBU to verify that the GNSS data used by the vehicle are correct. Since such a communication link can only be established with a vehicle that is in the vicinity of the RSU, this verification is done simply by comparing the position of the car as reported by the OBU with that registered in the RSU. If the verification fails, the RSU takes a picture of the infringing vehicle and enforcement proceeds as for speed-enforcing radar. An example of this type of system is disclosed in JP 2009/038586.

Applying the invention requires that the verification of the input data integrity is instead under control of a secure controller. Although the invention could work in the case where GNSS data integrity were protected through an authenticated channel, the use of RSU verification is a more practical embodiment due to the difficulties in establishing verified communication links with positioning satellites. The following examples assume that RSU verification is used, with each collected GNSS fix being signed by the secure controller. The latest GNSS fixes and signatures can then be transmitted to an RSU whenever the OBU has to respond to an enforcement request made by the RSU.

Map matching is typically a computationally intensive step that is not suited for being wholly implemented on a lightweight secure element such as considered herein. However a solution that avoids the need for this is to instead only verify that the Map Matching process has been correctly executed in the OBU host processor. The secure controller can for example be configured to verify that the distance between collected GNSS fixes and the selected roads is below some pre-defined threshold value. This requires that the map data that is contained in the tolling scheme database is augmented with authentication data (such as digital signatures) that can be used by the secure controller to attest to the integrity of the map information.

Once the roads have been identified, the tolling scheme formula for computing the fee must be evaluated. The data to evaluate the formula is contained in a fare database, for example stored in the host controller memory. Since evaluating the formula is typically a lightweight process, this evaluation can simply be reproduced in the secure controller to verify that the calculation has been done correctly. This requires that the fare database also contains authentication data to let the secure controller verify the integrity of the fare data.

Protecting the fee aggregation step can be done by moving this process altogether to the secure controller. Each computed section fee is reported to the secure controller, which accumulates the value in a secure counter, the final result of which is sent as a signed total to the tolling scheme server.

Figure 19:
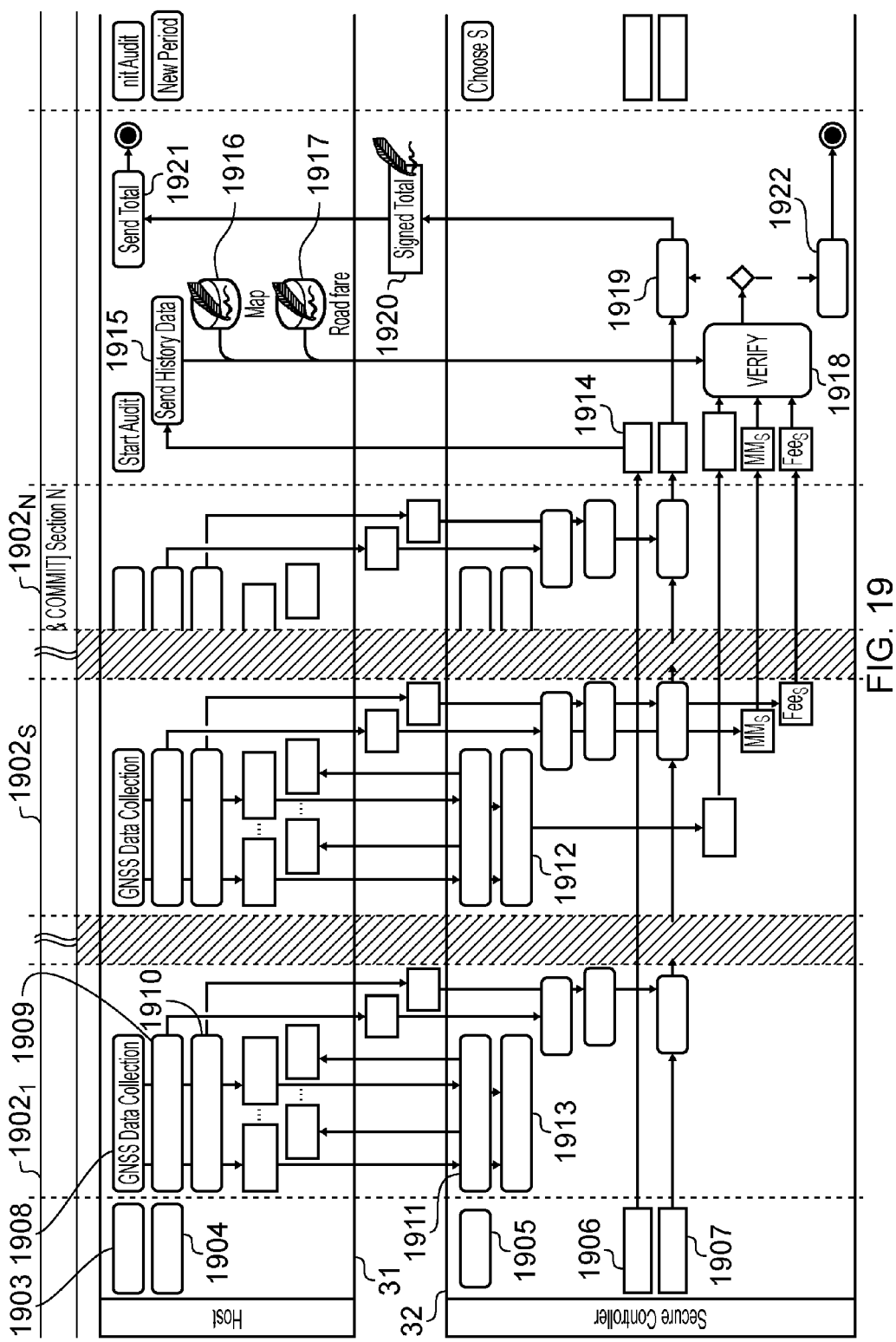
FIG. 19 is a schematic diagram illustrating an overview of sequences of operations involved in a secured road tolling application.

FIG. 19 illustrates an example on how a Road Tolling application can be secured according to an embodiment of the invention, in which operations are carried out by a host controller 31 and a secure controller 32. The example assumes that any journey can be split into N sections 1902, where each section $1902_{1-N}$ covers n GNSS fixes. Operations for Section 1 ($1902_1$), Section S ($1902_S$) and Section N ($1902_N$) are shown in FIG. 19 to illustrate this process. When the journey starts, the host controller initializes the audit process 1903 and starts a new audit period 1904. For each new period, the secure controller chooses 1905 randomly which section it is going to verify (section S, 1906), and resets the fee counter to 0 (1907). The operations carried out under section 1 $1902_1$ and section S $1902_S$ (assuming section 1 is not the section selected by the secure controller 32) illustrate the activity for each of the sections during one such period. Each section $1902_{1-N}$ consists of the Run & Commit phase carried out as a sequence of N sections. For each section the host controller 31 collects the GNSS data (1908), performs map matching (1909) and computes the tolling fee (1910). The host controller 31 commits the results of each processing step to the secure controller 32. For the GNSS Data Collection step, this is simply done by sending each GNSS fix $GNSS_{1,1-1,n}$, $GNSS_{S,1-S,n}$, $GNSS_{N,1-N,n}$ to the secure controller 32. In return, the secure controller 32 signs the last GNSS fix sent (step 1911), and returns the signature back to the host controller. This signature can be used by the host controller 31 to answer enforcement requests from RSU equipment.

For Map Matching, the host controller 31 computes a hash of the matched roads, and send this hash $MM_1$, $MM_S$, $MM_N$ to the secure controller 31 at the end of each section. For Fee Calculation, the commit is simply done by sending the computed fee $Fee_1$, $Fee_S$, $Fee_N$ to the secure controller. This fee is simply added to the current total stored in the secure controller, which is aggregated for each section. The secure controller 32 keeps the committed data (1912) only if the current section is the chosen section S; if the current section is not section S, the committed data is simply discarded (1913). The host controller 31 also logs all committed Map Matching data until completion of the audit period.

At the end of the Run & Commit sections, the Verify phase starts, in which the host controller 31 starts the audit process on the secure controller 32. The secure controller 32 tells the host controller 31 which section will be verified (step 1914), and the host controller 31 answers back with all Map Matching data that was logged during that period (step 1915), along with the necessary map and road fare data stored in the authenticated databases 1916, 1917. The secure controller 32 verifies the integrity of the map matching data by verifying the committed hash (step 1918) and the integrity of data coming from the authenticated database. If the integrity checks are successful, the verification proceeds with the verification of the Map Matching step, as detailed previously, and with verification that the fee has been correctly computed for that section.

If the verification is successful, the fee total is signed by the secure controller, and the signature is sent back to the host controller (steps 1919, 1920, 1921). This signature can be sent to the Road Tolling Server to indicate that the tolling fee has been successfully verified for that period. If, however, the verification fails the fraud manager in the secure controller is notified (step 1922). Once each period has been completed, a new period is started and the above process repeats.

The above described embodiment is just one particular variant on how the invention may be applied to a Road Tolling application. One possible problem with this embodiment is that if the Verify phase lasts too long, there is a possibility that the vehicle will pass an RSU and receives an enforcement request. If the secure controller is busy, the OBU may not be able to acknowledge this enforcement request in time, which could lead to a false positive fraud detection by the RSU. A solution for this is to postpone the Verify phase for each period until the end of the journey, i.e. when the car is stopped. In that case, when the Run & Commit phase for a period ends, a new period is started immediately. In this way there is no interruption to the signature of GNSS fixes by the secure controller. In this variant the host controller 31 must keep a log of all committed data during the journey, and the secure controller 32 must be capable of storing the committed data of all chosen sections.

In another variant, each GNSS fix is not sent separately to the secure controller, but instead the main controller performs a hash operation on all GNSS fixes in each section and commits to these fixes by sending the hash result to the secure controller at the end of each section. This limits the bandwidth requirement between the main and secure controllers, and avoids the GNSS fix data being submitted too many times to the secure controller, which is advantageous because, since each submission would typically be stored in EEPROM, this could lead to a rapid wearing of the secure controller memory, in the absence of any wear levelling operations being applied. In response to receiving the hash result, the secure controller would be configured to sign the hash result and return the signature to the secure controller.

In the above variant, enforcement by road-side unit would not be carried out in real-time but can instead be deferred. Enforcement would work as follows:

i) A road-side unit detects a car passing by, and logs the event (location+time) in a central database along with vehicle details such as the vehicle license plate.

ii) When the vehicle reports a fee, the central server makes a query to the central database to check if there is a pending enforcement check.

iii) If and enforcement check is pending, the vehicle is requested to forward details of the relevant section, including the signature generated by the secure controller, covering the time when the vehicle was spotted.

It has been demonstrated that, even though a complete process cannot be run in the secure controller, a system according to the invention can still effectively audit the complete process, using probabilistic detection. The general principle of the invention is twofold: (1) select randomly which part of the process to audit, and (2) make sure that the dependency between steps in the overall process is maintained (i.e. the "attacker" cannot inject or remove steps). The second step is preferably achieved through the use of history data, as described above.

The verification of GPS integrity is forcefully linked to the other processes by having the data submitted to the secure controller systematically (i.e. not only on request from roadside equipment). This is because the secure controller may not be fast enough to answer external enforcement request in real-time, and so the answer (i.e. GPS signatures) must be prepared in advance, or an enforcement request may be missed.

The audit is preferably not carried out on a complete journey, but only for a randomly chosen section (for example a 1 km section every N km).

To guarantee integrity of the sequence, the last GPS fix of the section preceding the one being audited must be used as the first fix of the section being audited. This ensures that an attacker cannot send independent sections that do not together make a continuous path with genuine sections.

Also, some real-time integrity checks can be done on the submitted GPS coordinates to prevent some basic attacks. These checks may include: verifying a timestamp difference between 2 fixes (which must be constant, except between 2 trips); checking that fixes draw a continuous path (i.e. the distance between 2 fixes must never be greater than a predefined value, incl. between 2 trips); and the velocity must be continuous. By doing so, this again protects the integrity of the sequence as it is required to apply correctly the invention. A check that the timestamp should be monotonically increasing may also be carried out, to prevent tampering through rolling back. This check would also be necessary in the case of deferred enforcement, to make sure that a tampered host controller could not resubmit data for a past period.

The general principle of the invention, in which the secure controller verifies the integrity of a selected subset of operations of the host controller, may also be applied to other applications. An example of such an application is in 'smart' metering, where the data processing apparatus of the invention is part of a metering system. A sensing unit in the form of an energy meter provides data to the host controller. The integrity of operations carried out by the host controller, for example to determine a total cost of energy usage, is verified by the secure controller.

Other embodiments are also intentionally within the scope of the invention, which is defined by the appended claims.

The invention claimed is:

1. A data processing apparatus comprising:
a local source of data;
a first controller; and
a tamper-resistant second controller configured to communicate with the first controller and to verify integrity of a series of calculation operations performed by the first controller, the first controller being configured to control and receive data from the local source of data and from a sensing unit connected to the first controller via a communication interface and to perform the series of calculation operations on the data, wherein the first controller is configured to record history data derived from a start state and a finish state of the series of calculation operations and transmit the history data to the tamper-resistant second controller, the tamper-resistant second controller being configured to one of randomly and pseudo-randomly select and verify one of the calculation operations to verify integrity of the series of calculation operations using the history data, wherein the first controller is configured to transmit the history data as each calculation operation is performed, the tamper-resistant second controller being configured to decide whether to store or discard the transmitted history data according to the selection of which operation is to be verified.

2. A vehicle telematics system comprising the data processing apparatus of claim 1, wherein the sensing unit is a location sensing unit and the local source of data comprises a source of map data, the first controller being configured to calculate a location of the vehicle based on data received from the location sensing unit.

3. The vehicle telematics system of claim 2, wherein the local source of data comprises a source of fare data, the first controller is configured to calculate a fare based on the calculated location and data received from both the source of fare data and the source of map data.

4. The vehicle telematics system of claim 2, wherein the tamper-resistant second controller is provided as a removable card comprising data for identifying a user of the vehicle telematics system.

5. The data processing apparatus of claim 1, wherein the tamper-resistant second controller is configured to one of randomly and pseudo-randomly select a subset of the calculation operations.

6. The system of claim 2, wherein the tamper-resistant second controller is configured to verify integrity of a selected subset of the calculation operations performed by the first controller during at least one of a location calculation operation and a fare calculation operation.

7. The data processing apparatus of claim 1, wherein the tamper-resistant second controller is configured to store the history data only for one selected operation to be verified.

8. The data processing apparatus of claim 1, wherein the history data is derived from a hash of the start state and the finish state of the series of calculation operations.

9. The data processing apparatus of claim 8, wherein the tamper-resistant second controller is configured to indicate to the first controller which of the history data are to be transmitted after the first controller has sent a hashed result of the calculation operations performed by the first controller.

10. A metering system comprising the data processing apparatus of claim 1, wherein the sensing unit is an energy meter and the first controller is configured to generate energy pricing based on data received from both the sensing unit and the local source of data.

11. A method of operating the data processing apparatus of claim 1, the method comprising:
- the first controller receiving data from the sensing unit and the local source of data;
- the first controller performing the series of calculation operations based on the received data;
- the first controller recording the history data derived from the start state and the finish state of the series of calculation operations and transmitting the history data to the tamper-resistant second controller; and
- the tamper-resistant second controller one of randomly and pseudo-randomly selecting and verifying one of the calculation operations performed by the first controller, verifying integrity of the selected calculation operations using the history data, and providing an indication of correct or incorrect verification.

12. A method of operating the vehicle telematics system according to claim 3, the method comprising:
- the first controller receiving data from the location sensing unit, the source of map data, and the source of fare data;
- the first controller calculating a location of the vehicle based on data received from the location sensing unit;
- the first controller calculating a fare based on the calculated location and the data received from both the source of fare data and the source of map data;
- the first controller recording history data derived from the start state and the finish state of a series of calculation operations and transmitting the history data to the tamper-resistant second controller; and
- the tamper-resistant second controller one of randomly and pseudo-randomly selecting and verifying one of the series of calculation operations, verifying the integrity of the selected subset of calculation operations performed using the history data and providing an indication of correct or incorrect verification.

* * * * *